L. KOLACZKOWSKI.
SPRING POWER BICYCLE.
APPLICATION FILED JULY 15, 1921.
1,409,454. Patented Mar. 14, 1922.
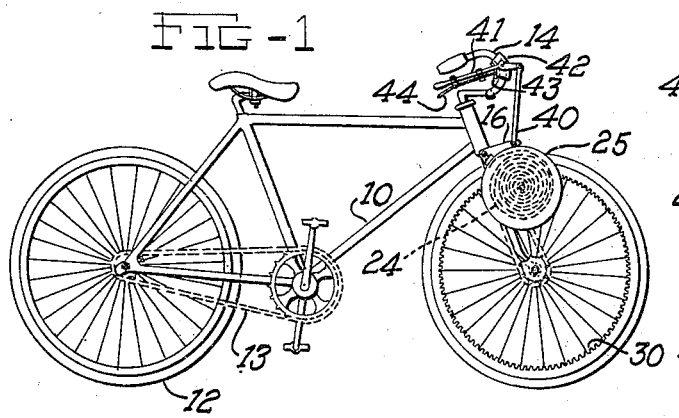
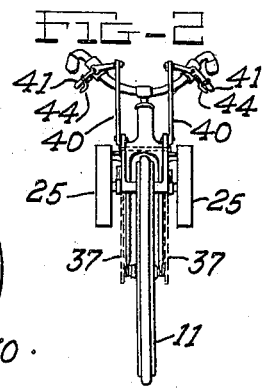
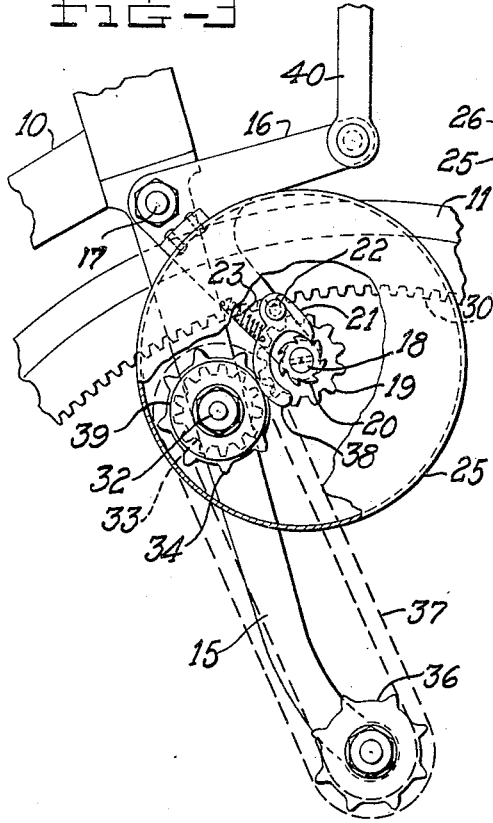
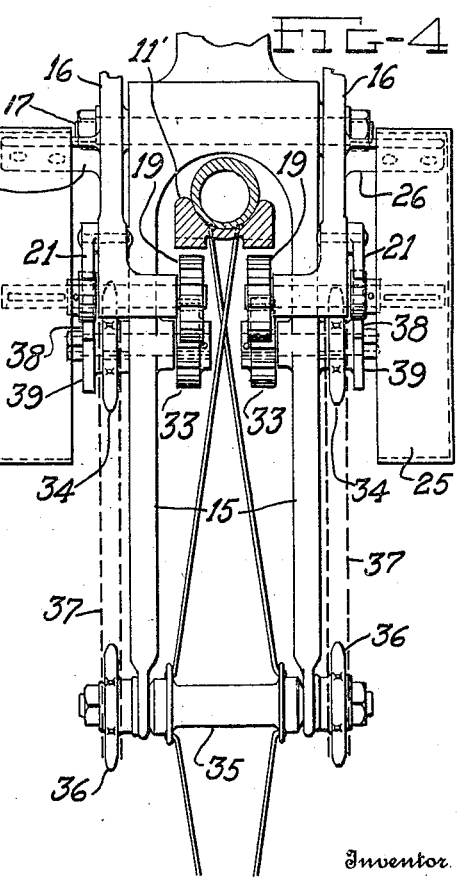
Inventor
LUKASZ KOLACZKOWSKI

UNITED STATES PATENT OFFICE.

LUKASZ KOLACZKOWSKI, OF HELMETTA, NEW JERSEY.

SPRING-POWER BICYCLE.

1,409,454.     Specification of Letters Patent.     Patented Mar. 14, 1922.

Application filed July 15, 1921. Serial No. 484,943.

*To all whom it may concern:*

Be it known that I, LUKASZ KOLACZKOWSKI, citizen of Poland, residing at Helmetta, in the county of Middlesex and State of New Jersey, have invented certain new and useful Improvements in Spring-Power Bicycles, of which the following is a specification.

This invention relates to bicycles, having more particular reference to a means for storing power when running downhill which may be utilized when climbing a hill or at any desired time.

The invention has for an object to provide a simple device of this type which can be readily mounted on a bicycle and which is easily controlled by the person riding on the bicycle.

For further comprehension of the invention, and of the objects and advantages thereof, reference will be had to the following description and accompanying drawings, and to the appended claims in which the various novel features of the invention are more particularly set forth.

Fig. 1 of the drawings is a side view of a bicycle having the invention applied thereto.

Fig. 2 is a front view.

Fig. 3 is an enlarged fragmentary side of the parts involved in the present invention, the spring casing being partly broken away.

Fig. 4 is a front view of the parts shown in Fig. 3, the wheel being shown in section.

In the drawings I show a bicycle of ordinary construction having the usual frame 10 mounted on the front and rear wheels 11 and 12, and provided with the usual chain drive 13, the front wheel having the usual steering handle bar 14.

According to the present invention I pivot to the usual forked frame members 15 in which the front wheel is mounted a pair of bell crank levers 16 one on each side of the front wheel, these members being shown as attached to the ends of a bolt 17 carried in the members 15. In one end of each of these levers 16 is journaled a stub-shaft 18 having fixed thereon a pair of gear pinions 19 and ratchet wheels 20, the latter being engaged by pawls 21 pivoted as at 22 on the levers and held in place by a spring 23. To each shaft 18 is fixed the ends of a clock-type spring 24 whose opposite end is fixed to an enclosing circular casing 25, the casings being riveted to a bracket 26 on the lever 16. The pawl 20 normally sets to keep springs 24 from unwinding.

Fixed to the rim 11' of the front wheel 11 are internal gears 30 with which the pinions 19 may be brought into mesh when the springs 24 are to be wound, the pinions being movable toward and away from the teeth of gear 30 by swinging the levers 16.

Suitably journaled in the frame members 15 are a pair of stub shafts 32 upon opposite ends of which are fixed gear pinions 33 and sprocket wheels 34, the pinions 33 being located at a suitable distance from the fulcrum points of levers 16 to be engaged by the pinions 19 on the latter when swung in the proper direction. Fixed to the axle 35 of front wheel 11 are a pair of sprocket wheels 36, chains 37 being looped over these sprocket wheels 36 and the sprocket wheels 34.

In order to cause pawls 21 to automatically disengage from the ratchet wheels 20 when the pinions 19 move into engagement with the pinions 33 the pawls have fixed thereto the curved fingers 38 which are adapted to be engaged by disks 39 on the stub shafts 32 to move the pawls away from the ratchet wheels.

To operate the levers 16 the latter have connected thereto the links 40, which connect also to handle levers 41 fulcrumed on brackets 42 on the handle bars 14, these brackets presenting arcuate edges each provided with a notch 43 adapted to be engaged by an ordinary slide bolt 44 on the handle lever, this notch 43 being so positioned that the bolt 44 will engage therewith when the pinion 19 is in a central position between the pinion 33 and gear 30 and disengaged from both.

It is believed that the manner of use and operation of my improved device will be readily understood from the above description. To wind springs 24 levers 16 are shifted to bring pinions 19 into engagement with gears 30, the pinions 19 being shifted back to neutral position when the springs are wound up, the bolt 44 engaging in notch 43 and holding the pinions in this position. When the power stored in springs 24 is to be used the levers 16 are shifted to move the pinions 19 into mesh with pinion 33 the pawls 21 being automatically lifted from the ratchet wheels 20 by the disks 39 engaging the fingers 38. The power stored in the springs 24 will thus act on the front wheel through the chains 37.

Having thus described my invention what I claim as new and desire to protect by Letters Patent of the United States is as follows:

1. In combination with the wheel of a bicycle, a spring power device, a gear formed on the wheel rim, a pivoted arm on which said power device is mounted, a gear pinion on said arm adapted to wind said power device, drive means for said wheel including a second gear pinion, and means for moving said arm to cause the pinion thereon to mesh either with the other pinion or with the rim gear.

2. In combination with a wheel of a bicycle, a spring power device, a lever arm having the said device mounted on the end thereof, a gear pinion carried by said lever to wind said device or be driven thereby, ratchet and pawl means holding said gear against rotation by said power device, drive means for said wheel adapted to be engaged by said gear pinion, a rim gear adapted to engage said pinion, and means for automatically releasing said ratchet and pawl means when the said arm is swung to move the said pinions into engagement with one another.

3. In combination with the wheel of a bicycle, a spring power device, a lever arm having the said device mounted on the end thereof, a gear pinion carried by said lever to wind said device or be driven thereby, ratchet and pawl means holding said gear against rotation by said power device, drive means for said wheel adapted to be engaged by said gear pinion, a rim gear adapted to engage said pinion, and means for automatically releasing said ratchet and pawl means when the said arm is swung to move the said pinion into engagement with one another, said means including a curved finger projecting from the pawl and a disk fixed co-axially to the wheel and adapted to be engaged by said finger.

4. In combination with the wheel of a bicycle, a clock-spring power device, an internal gear formed on the wheel rim, a bell-crank lever on which the said power device is mounted, a pinion on the end of said gear, a pinion mounted on the bicycle frame, a ratchet wheel fixed co-axially to said first pinion, a spring pressed pawl engaging said ratchet wheel, a finger on said pawl, a disk fixed co-axially to said second pinion, and a sprocket chain drive from said second pinion to said wheel.

5. In combination with the wheel of a bicycle, a clock-spring power device, an internal gear formed on the wheel rim. a bell-crank lever on which the said power device is mounted, a pinion on the end of said gear, a pinion mounted on the bicycle frame, a ratchet wheel fixed co-axially to said first pinion, a spring pressed pawl engaging said ratchet wheel, a finger on said pawl, a disk fixed co-axially to said second pinion, and a sprocket chain drive from said second pinion to said wheel, and means for shifting said bell-crank lever.

In testimony whereof I have affixed my signature.

LUKASZ KOLACZKOWSKI.